Jan. 15, 1946. H. E. BARBER 2,393,216
SAW CONSTRUCTION
Filed Dec. 21, 1943
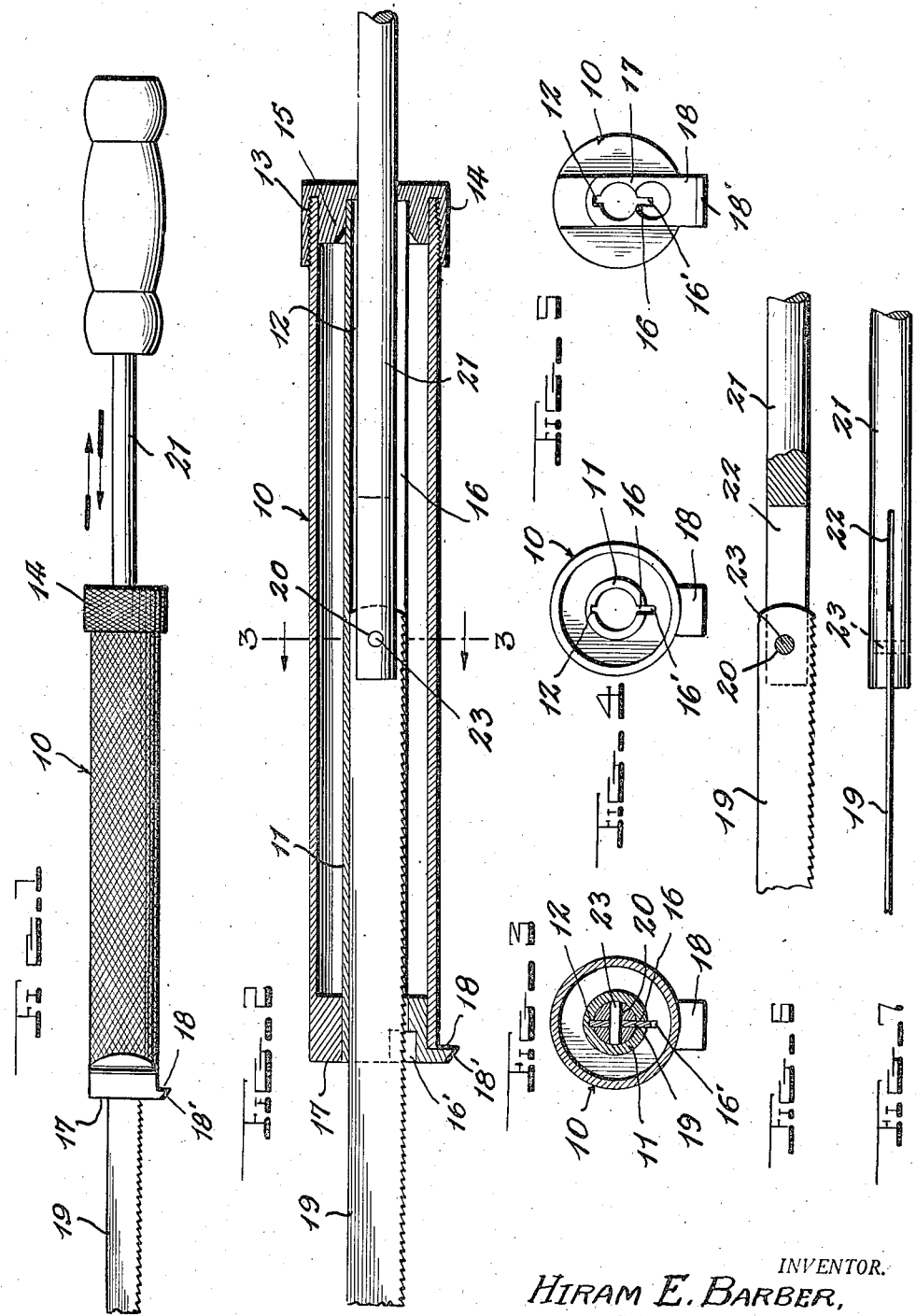
INVENTOR.
HIRAM E. BARBER,
BY
Christian R. Nielsen.
ATTORNEY.

Patented Jan. 15, 1946

2,393,216

UNITED STATES PATENT OFFICE 2,393,216

SAW CONSTRUCTION

Hiram E. Barber, Crete, Nebr., assignor to Southeast Aviation, Inc., Columbia, S. C.

Application December 21, 1943, Serial No. 515,132

3 Claims. (Cl. 145—31)

This invention relates to a saw and more particularly to a hand saw and it consists in the constructions, arrangements and combinations herein described and claimed.

It is a particular object of the invention to provide a saw guide and operating handle of novel construction making it possible to use flexible saw blades now generally in use on the market, in which the guide functions as a rigid guide for the saw blade as well as a handle for steadying the saw blade while in use.

More particularly, it is an object of the invention to provide a guide device for a saw blade, of elongated form, in which the blade is supported throughout the length of the operating stroke of the saw blade, thus lessening liability of breakage of the blade and enabling a steady guidance of the blade, and thus insuring a more accurate cutting of material.

It is a further object of the invention to provide a saw blade holder and guide in which the usual cumbersome frame for support of a flexible saw blade is eliminated, making it possible to employ the saw in the sawing of sheet material of substantial areas, as well as sawing material in curves of small radius, which is of advantage in various types of work.

Additional objects, advantages and features of invention will be apparent from the following description considered in conjunction with the accompanying drawing, wherein Figure 1 is a side elevation of the guide device.

Figure 2 is a longitudinal section thereof.

Figure 3 is a cross section on the line 3—3 of Figure 2.

Figure 4 is a rear end view of the guide with the saw blade and fastener cap removed.

Figure 5 is an end view of the guide.

Figure 6 is a side elevation partly in section, illustrating the connection between the saw blade and operating handle.

Figure 7 is an edge view thereof.

There is illustrated an elongated body member 10, shown as of cylindrical form in the present instance, although this shape is not essential to carry out the objects of the invention. The body is knurled, as shown, to afford a firm and comfortable grip. The body member 10 has an interior cylinder 11 integrally connected at the forward end of the body member, and extending longitudinally throughout the length of the cylinder 11. At its upper edge, there is formed a slot 12, extending the full length of the cylinder from one end to the other.

The cylinder 11 is formed concentrically with the body member 10 and the latter is externally threaded, as at 13, for reception of a screwthreaded cap 14, which as may be seen in Figure 2 is formed with a concentric inwardly projecting annulus 15 constructed and adapted to fit within the space formed between the body member 10 and the cylinder 11, thus affording support for the outer free end of the cylinder.

Diametrically opposite the slot 12, the cylinder 11 is formed with a longitudinal opening or slot 16, extending the full length of the cylinder and through the closure head 17 of the body member. The diameter of the cylinder is less than the width of the saw blade, so that the teeth thereof lie below the opening 16.

The closure head 17 is provided with a peripheral projecting extension or lip 18, preferably of tapered formation, as shown, the slot 12 and an opening 16' being formed therein, the latter being somewhat deeper than the slot 16, for accommodation of a saw blade, 19, therethrough, as will be described.

The blade 19 is preferably of the hacksaw-type, in which an opening 20 is formed adjacent one end, to which an operating rod 21 is detachably secured. The rod 21 is of a diameter slightly less than the inside diameter of the cylinder 11 for free reciprocating movement therethrough. A bifurcation 22 is formed in one end of the rod of a width to receive the blade 19 therewithin, a transverse opening being formed thereacross adapted to register with the opening 20 of the blade. The connection between the rod and blade is made by means of a headless pin 23, loosely fitting within the openings of the rod and opening 20, of the blade. The connection between the blade and rod normally lie within the open extremity of the sleeve, the cap 14 functioning to prevent full withdrawal. However, upon removal of the cap 14, the rod and blade may be readily withdrawn from the cylinder 11, the pin being allowed to drop from the openings and a new blade installed in the body member and connected to the rod. It should be noted that the blade may be replaced without the use of any tools whatever, and requires but a few seconds to effect the interchange of a blade.

Any suitable handle may be connected with the free end of the rod, in the present instance a plastic handle is employed, in which a longitudinal bore is formed, receiving the rod therethrough. The rod and handle may have a threaded engagement, if desired, the final securement being by means of a lock nut and washer, or other means may be employed.

The saw has been found especially useful in sawing panels and sheets of wood, metal, plywood and like materials, and is particularly well adapted to the severance of the material well within the center of the sheet, avoiding the need for a drilling operation to instigate the initial cut. In addition, it has been found that since the blade is longitudinally supported throughout the sawing action, a clean cut is obtained and liability of breakage of the blade is minimized.

The head 17 may be presented flush upon a sheet to be cut, although if it is desired to present the saw blade at an acute angle, the bevelled edge 18' may be employed.

It will be understood that the deepened slot 16' prevents the saw teeth from coming in contact with the base of the slot, the pressure exerted upon the blade under operation maintaining the back edge of the blade within the slot 12.

While I have shown and described the saw specifically, this is by way of illustration only, and I consider as my own all such modifications in construction as fairly fall within the scope of the appended claims.

I claim:

1. A saw comprising an elongated hollow body member having a head at one end adapted to engage material to be sawed, a tubular cylinder within the body member fixed to the head and extended therefrom, said cylinder having a longitudinal slot formed therein and extending through said head, said cylinder further having a longitudinal opening in opposed relation to the slot, said opening also being formed in said head but of greater depth, a saw blade disposed within said slot of a width to present the teeth outwardly of the opening of the cylinder, a handle member detachably connected to said saw blade and a closure cap for the open end of the body member and said cylinder, said closure cap having an opening for reciprocably mounting the handle member.

2. A saw comprising an elongated hollow body member having a head at one end adapted to engage material to be sawed, a tubular cylinder within the body member fixed to the head and extended therefrom, said cylinder having a longitudinal slot formed therein and extending through said head, said cylinder further having a longitudinal opening in opposed relation to the slot, said opening also being formed in said head but of greater depth, a saw blade disposed within said slot of a width to present the teeth outwardly of the opening of the cylinder, said saw blade having an opening in the end normally housed within said cylinder, a handle, said handle including a rod of a diameter freely reciprocable in said cylinder, the rod having a bifurcated inner end for reception of the apertured end of the saw blade, the bifurcated end of the rod having an opening aligned with the opening of the saw blade, a pin loosely fitted within the aligned openings, and an apertured closure cap for the open end of the body member and said cylinder, and receiving the rod therethrough.

3. A saw comprising an elongated hollow body member having a head at one end adapted to engage material to be sawed, a tubular cylinder within the body member fixed to the head and extended therefrom, said cylinder having a longitudinal slot formed therein and extending through said head, said cylinder further having a longitudinal opening in opposed relation to the slot, said opening also being formed in said head but of greater depth, a saw blade disposed within said slot of a width to present the teeth outwardly of the opening of the cylinder, said saw blade having an opening in the end normally housed within said cylinder, a handle, said handle including a rod of a diameter less than the width of the saw and freely reciprocable in said cylinder, the rod having a bifurcated inner end for reception of the apertured end of the saw blade, the bifurcated end of the rod having an opening aligned with the opening of the saw blade, a pin loosely fitted within the aligned openings, and an apertured closure cap for receiving said rod, said cap being with the body member, said cap including an annulus of a diameter to fit within the space between the body member and the cylinder to effect closure of the latter.

HIRAM E. BARBER.